W. P. TRAVER & L. F. THEIS.
CABLE ARMOR JOINT.
APPLICATION FILED DEC. 23, 1913.
1,137,931.
Patented May 4, 1915.
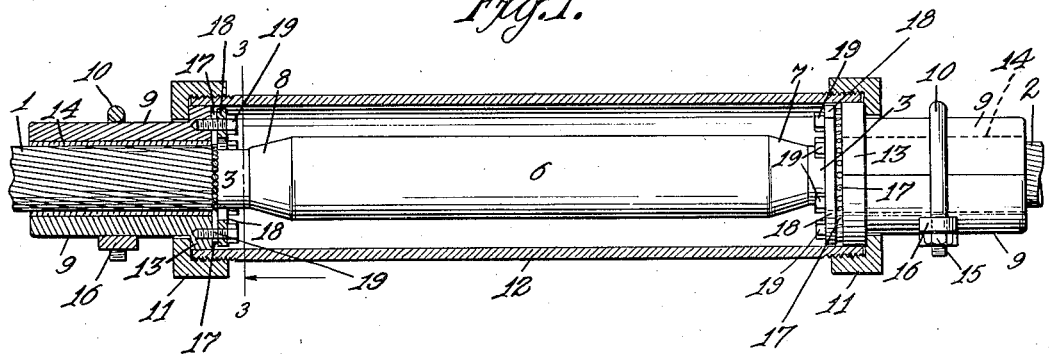
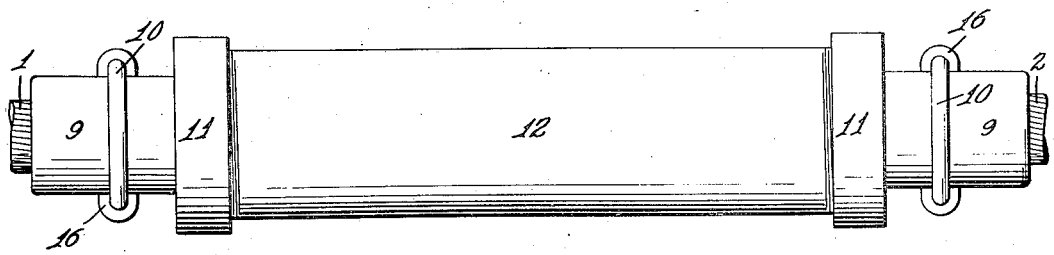
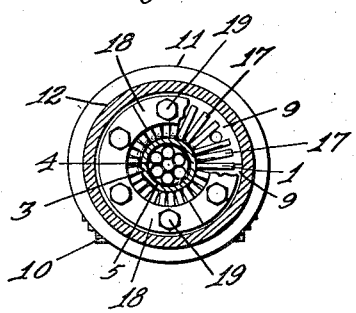
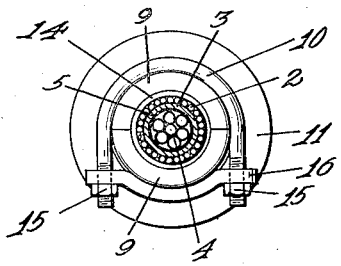
WITNESSES:
F. A. Simney
A. H. Kephart.
INVENTORS.
WALTER P. TRAVER
LOUIS F. THEIS.
BY
Carlos P. Griffin
ATTORNEY.

UNITED STATES PATENT OFFICE.

WALTER P. TRAVER AND LOUIS F. THEIS, OF SAN FRANCISCO, CALIFORNIA.

CABLE-ARMOR JOINT.

1,137,931.

Specification of Letters Patent.

Patented May 4, 1915.

Application filed December 23, 1913. Serial No. 808,326.

*To all whom it may concern:*

Be it known that we, WALTER P. TRAVER and LOUIS F. THEIS, citizens of the United States, residing at San Francisco, in the county of San Francisco and State of California, have invented a new and useful Cable-Armor Joint, of which the following is a specification in such full and clear terms as will enable those skilled in the art to construct and use the same.

This invention relates to a device for connecting the armor of a submarine or other electrical cables to the armor of an adjacent cable at a point where the electrical conductors are to be spliced together for the purpose of carrying the entire load due to the straining of the cables on the joint and armor, thereby protecting the electrical conductors and the insulating joint from breakage.

This invention is an improvement over the cable armor joint shown in United States Patent No. 1,035,499, heretofore granted to us on August 13, 1912, and an object of the invention is to reduce the size of the joint shown in that patent to make it applicable to smaller cables, such as are used in mines or for places where lighter cables are used than in marine work.

An embodiment of the invention is shown in the drawing in which the same reference numeral is applied to the same portion throughout, but we are aware that there are many modifications thereof.

Figure 1 is a side elevation partly in section of the complete joint, Fig. 2 is a plan view of the joint as it looks when completed, Fig. 3 is a transverse sectional view on the line 3—3 Fig. 1 looking in the direction of the arrow, and Fig. 4 is an end elevation of the complete joint.

The numeral 1 indicates the cable armor of one of the cables, 2 the armor of the other cable, 3 the lead pipe surrounding the electrical conductors 4 therein, said electrical conductors are suitably covered with an insulating material 5 and may be of such number as is deemed desirable. At the place where the electrical conductors are joined together they are covered with a larger lead pipe 6, said pipe being soldered to the lead pipes of the adjacent cables at 7 and 8.

The joint to carry the load of the armor is made up of four clamps 9, which are secured to the two ends of the cable by means of U bolts 10, two nuts 11 and a short length of pipe 12 large enough to go over the flanges 13 of the four clamps. The clamps 9 are semi-cylindrical and if not precisely the same size on the interior as the cable, they are provided with a bushing 14 which will bring them tightly into contact therewith and with the armor of the cable when the nuts 15 are tightened against the yoke 16 on the U bolt. When the cable is to be spliced two of the clamps are placed thereon and secured tightly to the cable by means of the U bolt, whereupon the armor is cut and the ends thereof are turned up as shown at 17 so that the wires will all lie flat against the flanges of the two clamps, whereupon two half circular rings 18 are tightly secured against the outturned wires by means of bolts 19. The rings 18 are so placed with respect to the two flanged clamps as to hold said clamps together even when the U bolt is removed therefrom, as is necessary to completely assemble the joint.

It will be understood by those skilled in the art that if the armor which is made of a very heavy and stiff steel spring wire is loosened that it will unwind for fifty or one hundred feet back from the place where it is loosened, unless precautions are taken to prevent that from taking place, so that in assembling the joint for use it is necessary first to put the two rings 11 on the two cables, afterward the pipe 12 is slipped over one of the cables and moved back far enough to be out of the way of the workers thereupon; the clamps and rings 18 are assembled upon the two cables, after which the ends of the electrical conductors are joined and the pipe 6 is put in place and soldered, wipe-joints connecting it with the pipes of the two joined cables. As soon as the wipe joints have been made one of the U bolts is removed from the two clamps it holds together, a temporary binding being used to hold said clamp until the pipe 12 and one of the nuts 11 can be slipped up into place, whereupon the U bolt may be again placed upon the clamps 9 and the other nut 11 is similarly brought into contact with the other end of the pipe 12, whereupon the two nuts are secured thereon leaving the joint as shown in Figs. 1 and 2, so that all of the load at the joint is carried by the pipe 12 and the cable armor, none of it being brought upon the wipe-joint or the joined electrical conductors therein.

Having thus described our invention what we claim as new and desire to secure by Letters Patent of the United States, is as follows, modifications within the scope of the claims being expressly reserved:

1. A cable armor joint comprising flanged clamps to be connected to the armor of a cable, bolts to bind the clamps tightly against the cable, a tube adapted to pass over the flanges of said clamps, and means to secure said tube to each of said clamps to relieve the cable of all load between said clamps.

2. In a cable armor joint, flanged clamps to be secured to the armor of a cable, bolts to bind the clamps tightly against the cables, a tube slidable over the flanges of said clamps, and threaded nuts to connect said tube to said clamps.

3. A cable armor joint comprising flanged clamps to be connected to the armor of a cable, a ring and bolts to secure the outturned ends of the wires forming said armor to said clamps, and means to connect two of said clamps together to carry the load on said cable between the clamps.

4. A cable armor joint comprising two sets of clamps and bolts to secure said clamps to a cable, means to secure the wires forming the armor of said cable to each of said clamps, a tube adapted to pass over said clamps, and means to secure said tube to each of the clamps.

5. A cable armor joint comprising two sets of clamps and bolts to secure said clamps to a cable, a ring and bolts to secure the wires forming said armor to each of the clamps, an internally threaded nut on each clamp, and a tube fitting over said clamps and to which said internally threaded nuts are connected.

In testimony whereof we have hereunto set our hands this 17th day of December A. D. 1913, in the presence of the two subscribed witnesses.

WALTER P. TRAVER.
LOUIS F. THEIS.

Witnesses:
C. P. GRIFFIN,
HENRY B. LISTER.